United States Patent
Kearney

[11] Patent Number: 5,845,999
[45] Date of Patent: Dec. 8, 1998

[54] SEALED BALL AND ROLLER BEARINGS

[76] Inventor: James F. Kearney, 1424 6th St., West Babylon, N.Y. 11704

[21] Appl. No.: 743,926

[22] Filed: Nov. 5, 1996

Related U.S. Application Data

[63] Continuation-in-part of Ser. No. 446,240, May 22, 1995, abandoned, which is a continuation of Ser. No. 21,313, Feb. 23, 1993, abandoned, which is a continuation-in-part of Ser. No. 804,025, Dec. 9, 1991, abandoned.

[51] Int. Cl.[6] .............................. F16C 19/08; F24F 13/14
[52] U.S. Cl. ......................... 384/537; 454/335; 137/601; 384/504
[58] Field of Search ..................................... 454/277, 278, 454/281, 282, 319, 325, 335, 347, 351, 352, 363; 137/601; 384/477, 484, 485, 486, 499, 504–506, 537, 559, 564, 569, 584

[56] References Cited

U.S. PATENT DOCUMENTS

| | | | |
|---|---|---|---|
| 1,872,599 | 8/1932 | Le Grand | 454/319 |
| 3,004,808 | 10/1961 | Powers | 384/564 |
| 3,098,684 | 7/1963 | Staneff . | |
| 3,144,282 | 8/1964 | Medley | 384/477 X |
| 3,192,002 | 6/1965 | Carter, Jr. . | |
| 3,596,533 | 8/1971 | Nightingale . | |
| 3,633,981 | 1/1972 | Suhr | 384/505 |
| 3,696,804 | 10/1972 | Paredes | 137/601 X |
| 3,746,042 | 7/1973 | Finkel | 137/601 |
| 4,241,647 | 12/1980 | Herr | 137/601 X |

*Primary Examiner*—Thomas R. Hannon
*Attorney, Agent, or Firm*—Schweitzer Cornman Gross & Bondell LLP

[57] ABSTRACT

A bearing-supported damper system has a frame within which a plurality of vanes are rigidly supported on control rods. Bearing assemblies rigidly connected to the ends of the control rods are supported by the frame and provide free pivotal movement for the vanes.

3 Claims, 3 Drawing Sheets

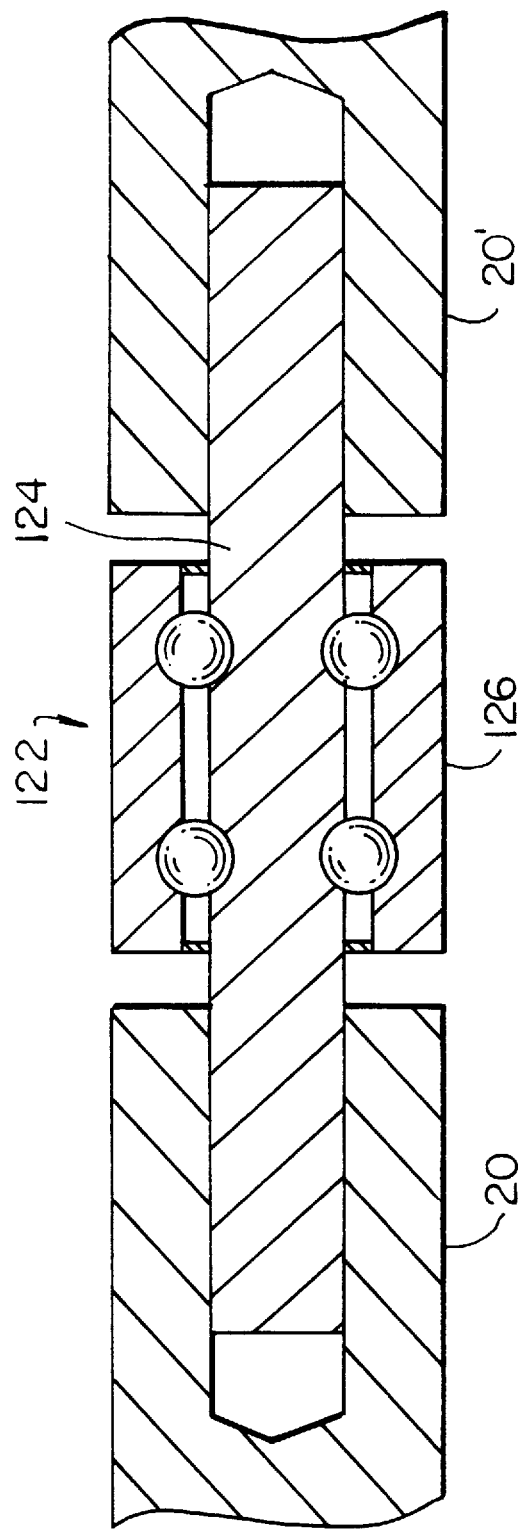

SEALED BALL AND ROLLER BEARINGS

RELATED APPLICATIONS

This application is a Continuation-In-Part of prior patent application having Ser. No. 08/446,240, filed May 22, 1995, now abandoned, which was a continuation of patent application, having Ser. No. 08/021,313, filed Feb. 23, 1993, now abandoned, which was a continuation-in-part of patent application having Ser. No. 07/804,025, filed Dec. 9, 1991, now abandoned.

FIELD OF THE INVENTION

The invention of the applicant generally relates to improvements in damper systems, and in particular, to damper systems having a plurality of vanes pivotally mounted within a support frame.

BACKGROUND AND SUMMARY OF THE INVENTION

Conventional damping systems typically include vanes with control rods simply mounted in a support frame. However, when used in dirty or dusty environments, such conventional devices usually result in unreliable and unacceptable operation because friction producing substances get between the support and the control rods.

The present invention improves upon conventional damping systems by incorporating sealed bearing assemblies connected to the support rods. The sealed bearings are mechanically affixed to the control rods or shafts of dampers permitting the damper blades to move upon completely sealed ball or needle bearings resulting in efficient dampers that are capable of freely opening and closing regardless of the environment in which the dampers are operating.

BRIEF DESCRIPTION OF THE DRAWINGS

FIG. 3 is a cross-sectional, side elevational view of a second embodiment of a bearing assembly.

DETAILED DESCRIPTION

Figure 1:
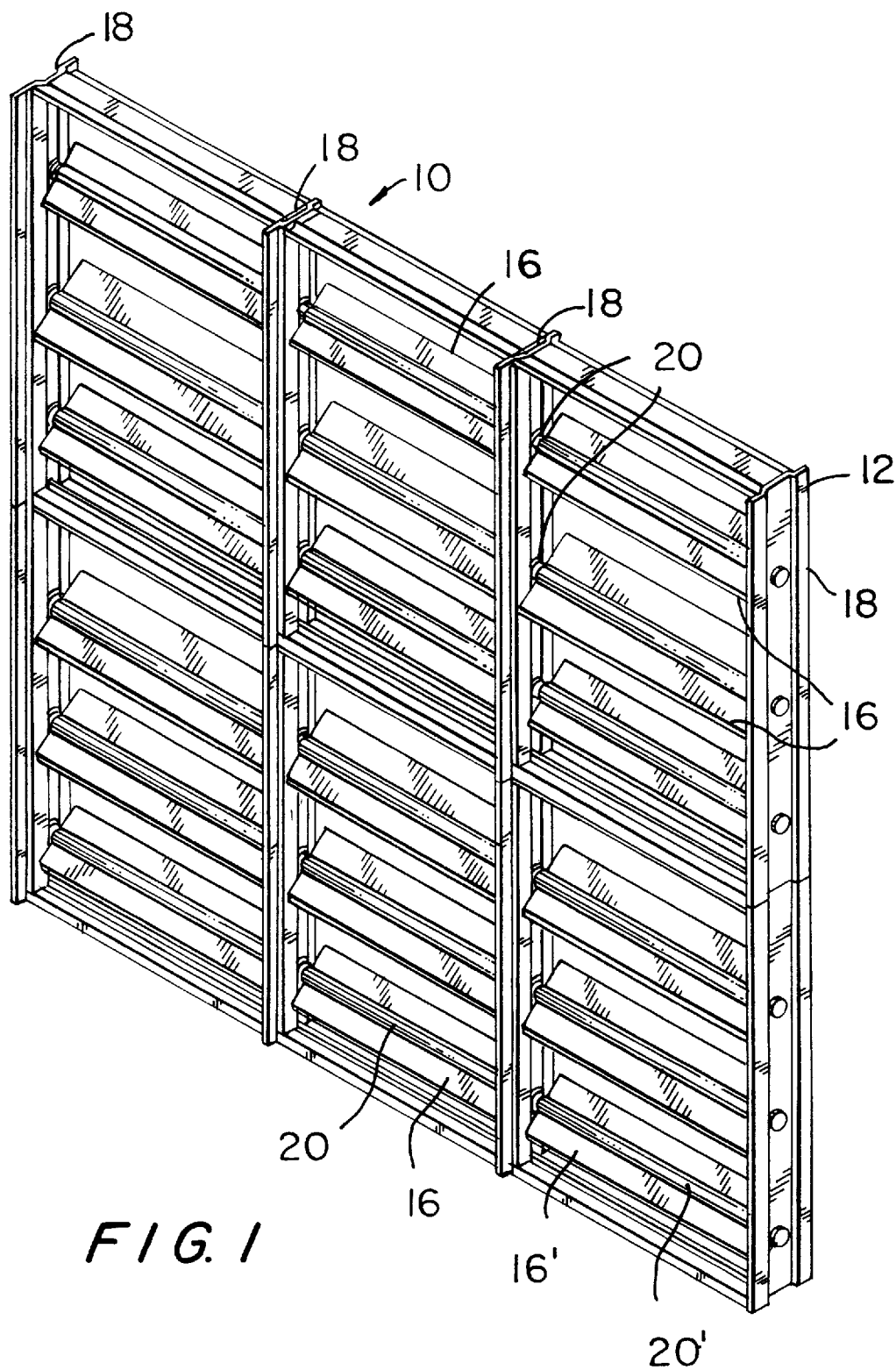
FIG. 1 is a perspective view of a damper assembly according to the present invention.

Referring to the drawing, and initially to FIG. 1 thereof, the bearing-supported damper system 10 of the present invention includes a frame 12 with a number of usually vertical, spaced-apart support members 18. The damper system 10 also includes a plurality of vanes 16 which are rotatably supported between by the support members 18.

The vanes 16 include control rods 20 extending from each end thereof. Bearing assemblies (not shown) are fixedly connected to the ends of the control rods 20 such as by force fitting or by male and female mechanical attachments, or the like. The bearings assemblies are supported by the support members 18 to provide frictionless rotational support for the vanes 16, thereby greatly reducing the effort and energy required to operate the damper system 10, while increasing the useful lifespan of the damper system dramatically.

Figure 2:
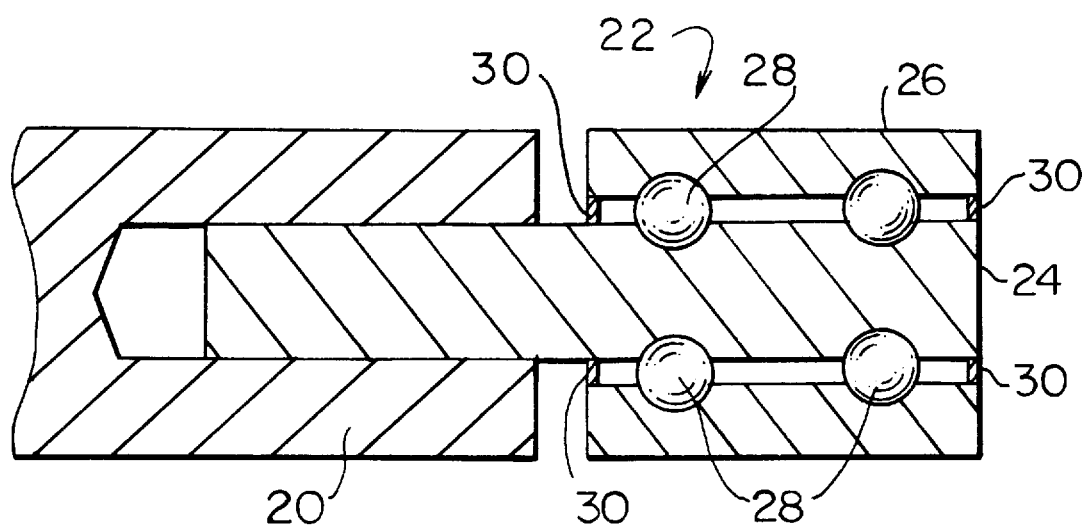
FIG. 2 is a cross-sectional, side elevational view of a bearing assembly of the present invention.

Referring to FIG. 2, the bearing assemblies, generally referred to by the reference numeral 22, each include an inner core 24 and an outer housing 26, which enclose either pin- or, as shown, ball-type bearing elements 28. The core 24 extends outwardly from the housing 26 and is rigidly connected to a control rod 20 of a damper vane 16 (not shown). The extending end of the inner core 24 can be hollow or solid, as shown.

The outer housing 26 surrounding the bearing elements 28 can be sized appropriately and, specifically, can be sized to equal the diameter of the control rod 20, as depicted. In addition, the bearing assemblies 22 can be sealed in a known manner, such as with rings 30, to reduce or prevent the ingress of contaminants and corrosive substances, and the like, into the internal portions of the bearing assemblies 22.

Referring to FIGS. 1 and 3, the inner core 124 of the bearing assembly 122 can extend outwardly from each end of the outer housing 126 to provide for attachment to two control rods 20, 20' of separate vanes 16, 16'. Thus, it can be appreciated that horizontally-adjacent vanes 16, 16' can be interconnected via one bearing assembly 122 of the present invention.

It can be appreciated that sealed bearing assemblies of the type used in the present invention are inexpensive to manufacture and incorporate into a damper system. Thus, the novel structure of a damper system with sealed bearing assemblies allowing for free pivotal movement of the vanes provides significant improvements in energy consumption and longevity while avoiding any substantial increase in production costs.

It should be understood, of course, that the specific form of the invention herein illustrated and described is intended to be representative only, as certain changes may be made therein without departing from the clear teachings of the disclosure. Specifically, the applicant's invention also contemplates sealed bearings incorporated as an integral part of the control rods at either their terminal ends or mid-sections. Accordingly, reference should be made to the following appended claims in determining the full scope of the invention.

I claim:

1. A bearing-supported damper assembly, comprising:
   (a) a frame including at least two spaced-apart support members;
   (b) at least one vane pivotally mounted between said support members, said vane having a control rod rigidly connected to and extending from each end thereof;
   (c) two bearing assemblies, each bearing assembly being fixedly connected to one of said control rods and being supported by one of said support members, said two bearing assemblies providing for free rotational movement of said vane with respect to said frame;
   (d) each bearing assembly has an inner core surrounded by an outer housing enclosing rotational bearing elements;
   (e) said inner core has an end which extends outwardly from said outer housing and is fixedly connected to one of said control rods; and
   (f) said outer housing is supported by one of said support members.

2. A bearing-supported damper assembly as in claim 1, wherein said bearing assembly is sealed to prevent the ingress of contaminants and corrosive substances.

3. A bearing-supported damper assembly as in claim 1, wherein each said outer housing has a diameter substantially equal to a diameter of an associated control rod.

* * * * *